United States Patent [19]
Gerbe

[11] Patent Number: 5,711,595
[45] Date of Patent: Jan. 27, 1998

[54] ILLUMINATED SERVING TRAY

[76] Inventor: James Robert Gerbe, 183 Lillian Rd., Nesconset, N.Y. 11767

[21] Appl. No.: 518,208

[22] Filed: Aug. 23, 1995

[51] Int. Cl.[6] .................................................. F21V 9/00
[52] U.S. Cl. .......................... 362/84; 362/154; 362/208
[58] Field of Search ............................. 362/84, 98, 99, 362/101, 154, 208, 253, 806; 40/555, 542; 250/462.1; 206/562, 563

[56] References Cited

U.S. PATENT DOCUMENTS

| | | | |
|---|---|---|---|
| 2,114,460 | 4/1938 | Ziegler | 362/154 |
| 2,461,549 | 2/1949 | Jacobs | 250/462.1 |
| 3,017,051 | 1/1962 | Rosenfeld | 250/462.1 |
| 3,097,797 | 7/1963 | Crain . | |
| 3,705,982 | 12/1972 | Smolinski | 362/97 |
| 3,829,083 | 8/1974 | Shung et al. . | |
| 3,862,505 | 1/1975 | Jeroma . | |
| 4,183,665 | 1/1980 | Iannedrea et al. . | |
| 4,446,508 | 5/1984 | Kinzie | 362/208 |
| 4,564,887 | 1/1986 | Kier . | |
| 4,626,971 | 12/1986 | Schultz . | |
| 4,640,033 | 2/1987 | Bulger . | |
| 4,691,470 | 9/1987 | Landell et al. | 362/191 |
| 4,790,752 | 12/1988 | Cheslak . | |
| 4,803,604 | 2/1989 | Nichols et al. . | |
| 4,809,141 | 2/1989 | Leopold et al. . | |
| 5,037,162 | 8/1991 | Ransom . | |
| 5,251,397 | 10/1993 | Exum et al. . | |
| 5,355,289 | 10/1994 | Krenn . | |
| 5,430,628 | 7/1995 | Saunders | 362/154 |

OTHER PUBLICATIONS

Nov. 1995 "Nightclub & Bar" Magazine.
"The Jel Shooter Shot Tray" advertisement.

Primary Examiner—Y. My Quach
Attorney, Agent, or Firm—Richard B. Klar

[57] ABSTRACT

The present invention relates to an illuminated serving tray. The tray has a plurality of receptacles for housing products to be dispensed and a light source for illuminating the tray. The tray is made of photoluminescent material with a reflective label positioned above the central portion of the tray and in line with the light source which is connected to and positioned below the bottom of the tray so that the light from the light source and any ambient light is reflected back by the reflective label and transmitted through the photoluminescent material of the tray causing the tray and the edges of the tray to glow.

23 Claims, 5 Drawing Sheets

_5,711,595_

ILLUMINATED SERVING TRAY

BACKGROUND OF THE INVENTION

1. Field of the Invention

The present invention relates to a serving tray. In particular the present invention relates to an illuminated serving tray having a plurality of receptacles for housing products to be dispensed including but not limited to beverage containers. A light source connected to the tray supplies the light to illuminate the tray.

2. The Prior Art

Serving trays are known in the prior art. For instance, U.S. Pat. No. 4,803,604 provides a tray having a housing with an outer rim and a flat surface recessed within the rim. LED's are positioned on the tray rim such that the light from the LED's, when illuminated can be seen from a vantage point, above and below the tray. Additionally, U.S. Pat. No. 5,355,289 granted to Ronald Kreun provides a lighted serving tray having a plurality of lights, a flat bottom surface, outer rim, and a hollow transparent tube connected to the tray next to the outer rim. Finally, U.S. Pat. No. 3,705,982 granted to Richard Smolinski provides an illuminated serving tray with a depth sufficient to secure a penlight within, with a translucent pane thereover ideally having a skidless textual upper surface.

However, it would advantageous to be able to hold a product to it would also be advantageous to be able to place the tray at different angles. The tray can also be used as a promotional tool to sell the product as well as serve it. It attracts attention to the product and permits the tray to be used to advertise the product.

SUMMARY OF THE INVENTION

It is a principle object of the invention to provide a serving tray which has a plurality of openings that are adapted to receive and securely hold within a product that is to be served, and also, that the tray is fabricated from a fluorescent material with optical characteristics that allow it to transmit a high percentage of light it receives from a light source attached to the tray and from any ambient light, thus illuminating the tray.

It is a further object of the invention to provide a reflective label on said tray to advertise a product housed within openings or receptacles in said tray, wherein the label is located directly over the light source and reflects the light back into the tray so that the light is dispersed throughout the tray. This label may also be partially transparent, allowing some of the light through in order to create a projection type of image to shine on a wall or a ceiling.

It is a further object of the invention to have an illuminated serving tray that has a light source that also functions as a handle for carrying the tray and for placing the object down on a surface.

It is still a further object of the invention to have legs on said tray to be able to place the tray at different angles on a surface. The legs allow the tray to be placed down without damaging or affecting the product being served. In the case of the round tray the legs keep the tray from rolling when placed down.

DETAILED DESCRIPTION OF PREFERRED EMBODIMENTS

Figure 1:
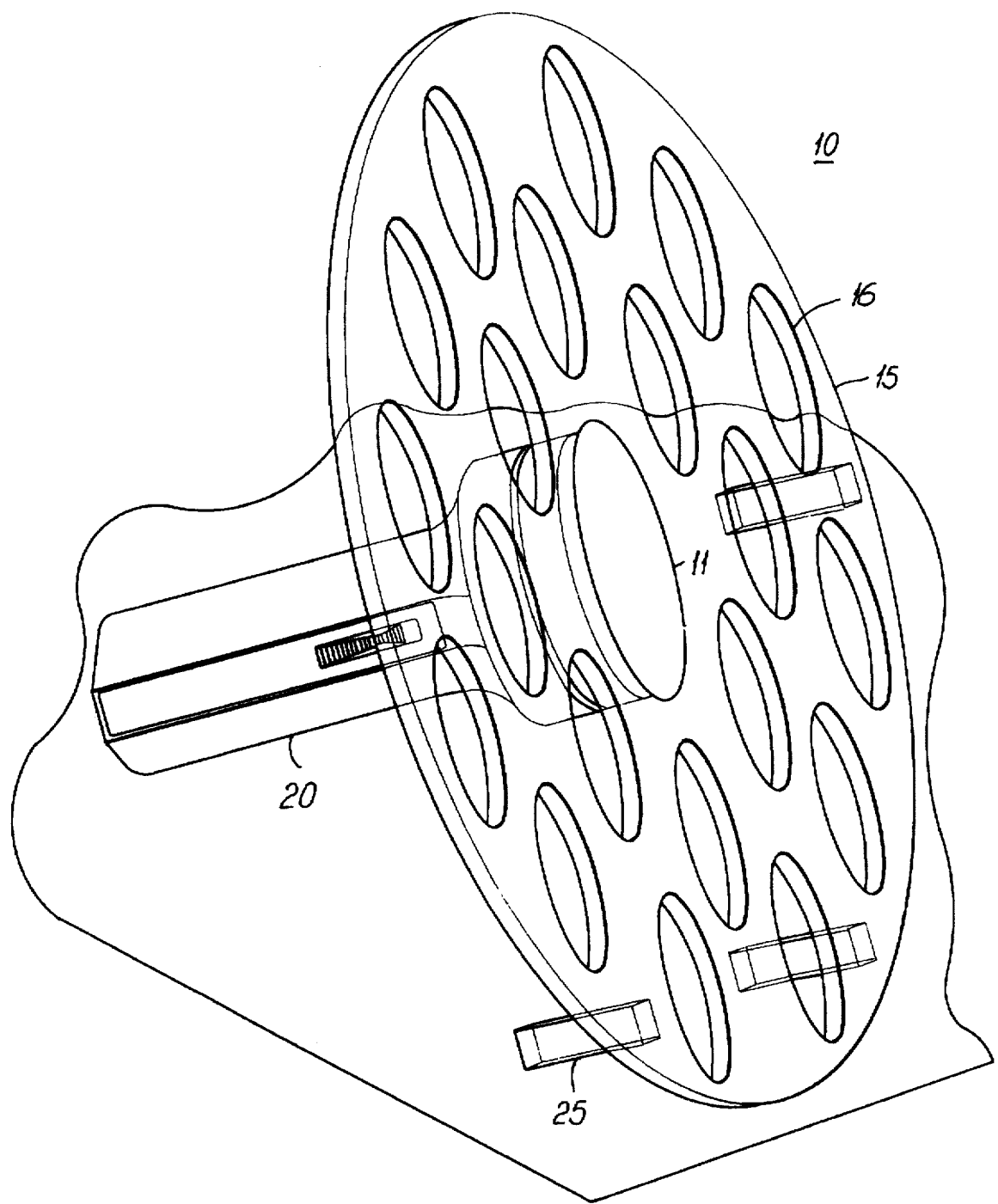
FIG. 1 is a perspective view of the present invention.
Figure 2:
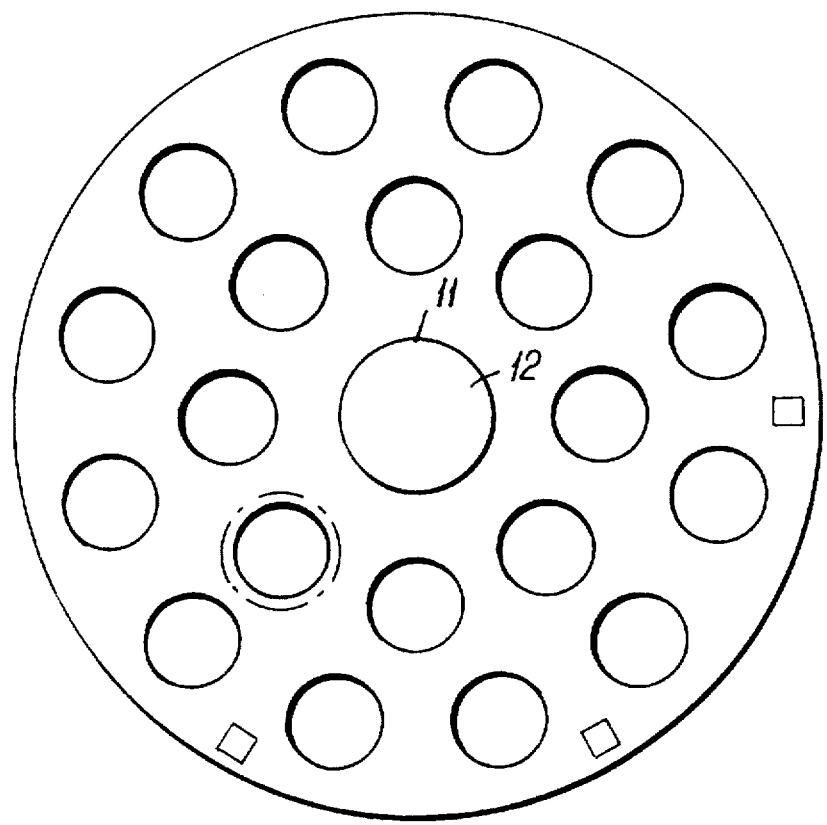
FIG. 2 is a top view of the tray of the present invention.
Figure 3:
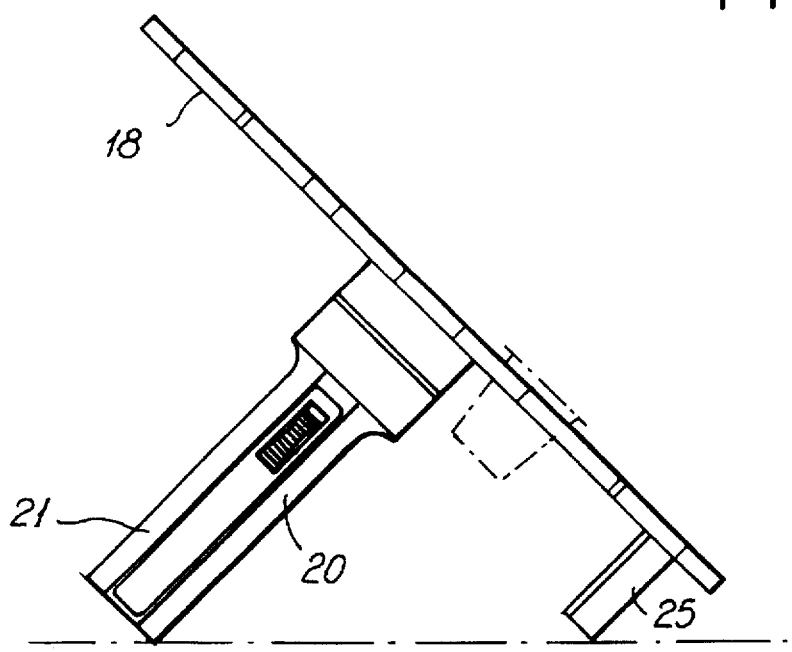
FIG. 3 is a side view of FIG. 1 of the present invention.

Referring now to FIGS. 1-4 of the drawings, FIG. 1 shows the serving tray 10 of the present invention which includes a tray 15, preferably circularly shaped and having a plurality of recepticals 16 preferably formed as apertures or holes in the tray 15. It is understood that the invention is not limited to a tray having a particular geometrically shaped configuration such as being circularly shaped, and the tray can be formed in any shape or configuration as desired including but not limited to rectangularly shaped, S-shaped, triangularly shaped, etc. These holes 16 serve to house containers which are dispensed from the tray such as containers of beverages. These holes 16 are preferably uniformly dimensioned with respect to one another and uniformly distributed about the tray 15. The uniform distribution is desired as it permits maximum light dispersion of the light from the center of the tray to its outer edges. As shown in FIG. 1, these holes or openings 16 are created by two sets of circles having a common center at the center portion of the tray to provide a smaller circle and a larger circle of these holes 16. The containers which may be housed in each of these holes 16 are preferably plastic type containers with pull-off plastic lids that are used for beverage drinks. It is however understood that the present invention is not limited to just housing plastic type containers. These holes 16 are centered so that the head portion of such a container is positioned above the tray 15 as shown in dashed lines in FIG. 3. It is understood that the invention is not limited to any one particular shaped opening for any of these holes or for that matter the receptacles can have bottoms and side walls for securely containing the beverages. The size of the openings 16, as shown in FIGS. 1-3 are dimensioned so that each securely holds yet also permits the easy removal of each of the containers housed therein. This is achieved by dimensioning the opening 16 to have a diameter slightly smaller than the diameter of each of the head portions of each of the containers.

The tray 15 is preferably formed of a highly fluorescent material including but not limited to acrylic plastic. The highly fluorescent material has a high degree of clarity permitting the light received to be dispersed throughout the tray. By making the tray of a highly fluorescent material it reacts well under ultraviolet lights, such as a black light that is used in many night clubs. The tray may be made of a clear colored fluorescent acrylic plastic such as either acrylic sheets in fluorescent colors that are readily available, or which can be formed by injection molding or by any other means. In another embodiment the highly fluorescent material of the tray may be coated with and or manufactured with a phosphorescent coating to further enhance the glowing of the tray 15.

Figure 4:
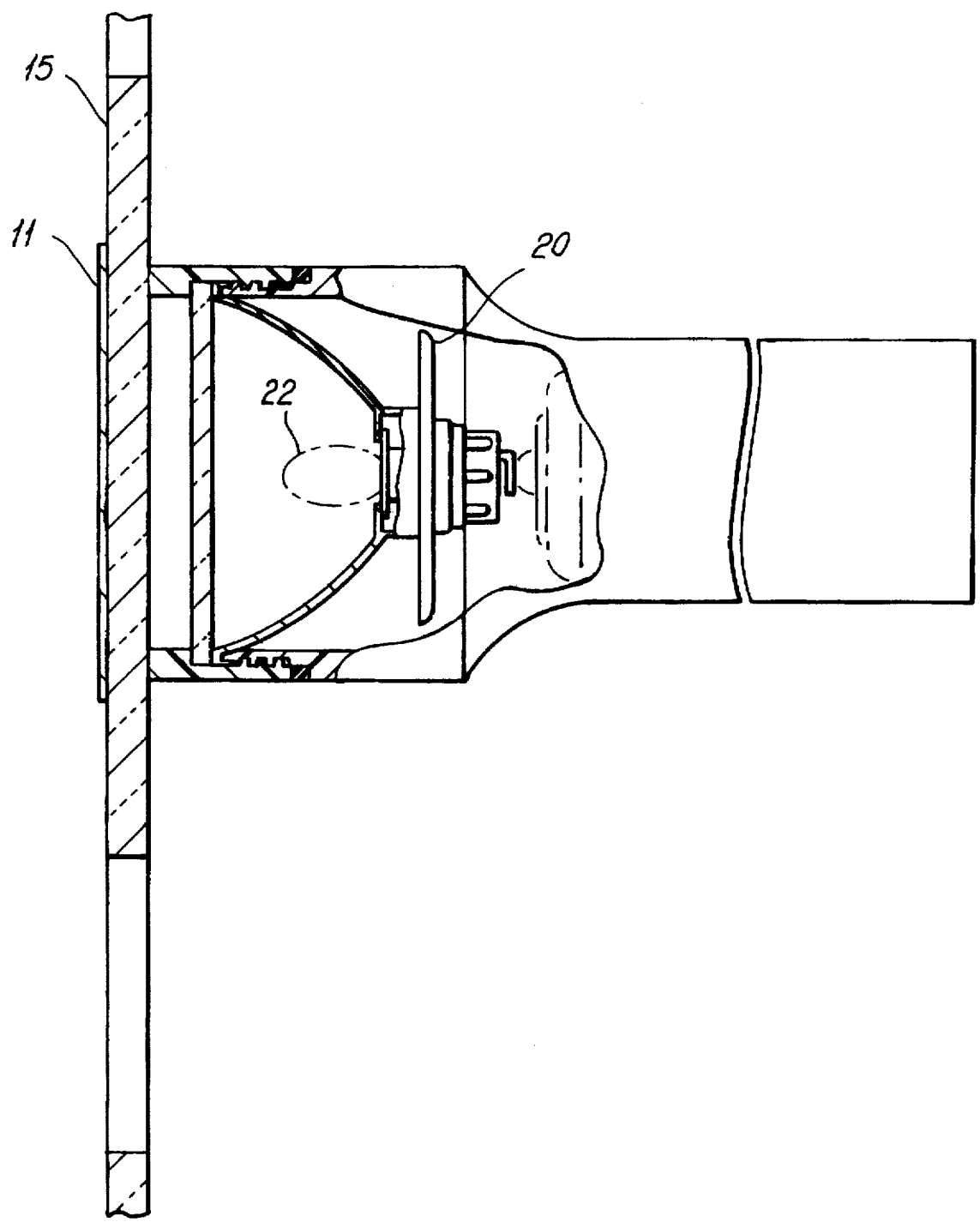
FIG. 4 is a sectional view of the light source of the present invention.
Figure 5:
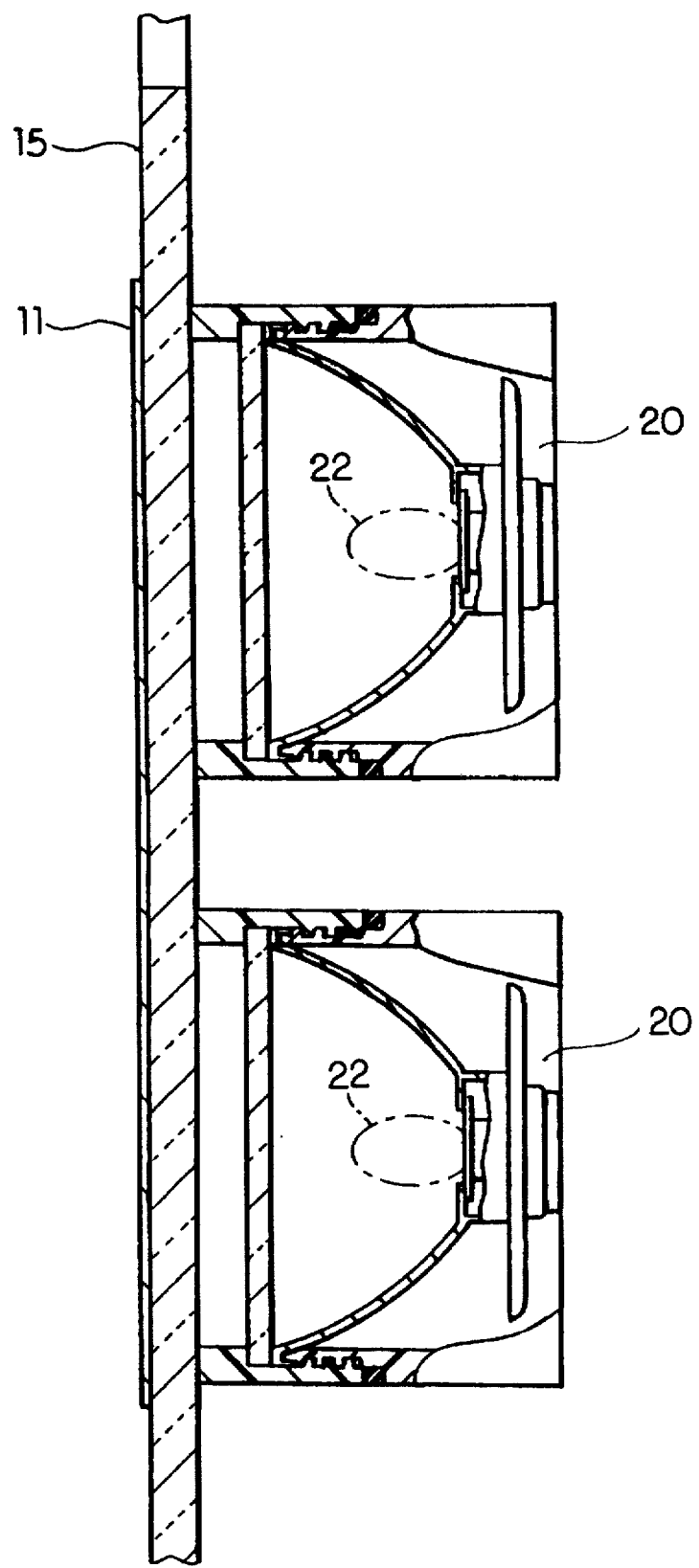
FIG. 5 is a modified embodiment of the invention illustrating the use of two light sources instead of one light source.
Figure 6:
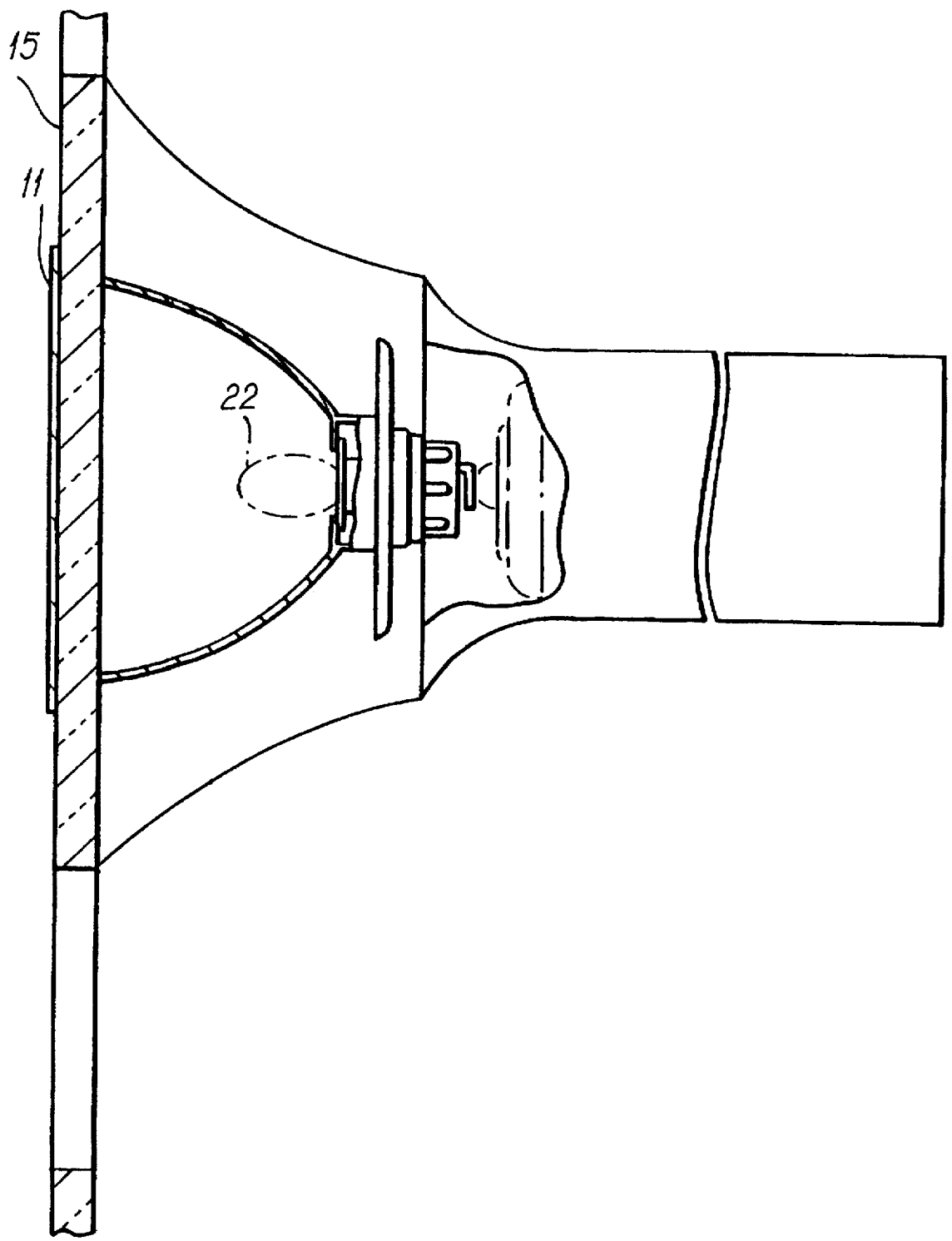
FIG. 6 is another embodiment of the invention in which the light source is part of the tray formed by injection molding.

A light source 20 is attached to the underside of the tray 15 at its center portion, as shown in FIG. 1. The light source 20 may be a flashlight 20, however, it can also be any other type of light source as well. For example, the light source may have a housing which is part of the tray formed by injecting molding. As a flashlight, the flashlight handle portion 21 serves as a handle for carrying the tray 15. The light source 20 includes a light bulb 22 as with the flashlight 20 as shown in FIG. 4. The light bulb 22 may be any kind of commercially used light bulb such as a krypton bulb. When the light source 20 illuminates the tray 15 it causes the entire tray 15 to light up and the outer edge 18 of the tray 15 is lit up as well. In addition, due to the photoluminescent properties of the material of the tray 15 reacting to the ultraviolet or black lights in the night clubs, bars, trade shows, promotions, etc., the edge glow effect of the tray 15 is enhanced because the tray 15 is made of highly fluorescent material. The light source 20 may be two light sources located at different places of the tray 15.

The tray 15 further includes legs 25 and preferably three legs 25 as shown in FIG. 1. These legs 25 permit the tray to be placed down on a table or counter at a tilted angle to the counter. In this manner the tray 15 can be loaded up with the product and while in this position also serve as a display for the product.

The reflective label 11 is preferably placed on the top center portion 12 of the tray 15. Label 11 can either be applied adhesively or silk-screened to the tray 15 or may be molded as part of the tray 15, or applied by any known means. The label 11 preferably contains a logo of the name of the product in the container which being is dispensed. By placing the logo on the label directly over the beam of light of the light source 20 at the center 12 of the tray 15, light is reflected back into the plastic to be transmitted and escapes through the edges 18 thus assisting in the tray's edge being lit. Thus, the serving tray 10 serves as a promotional display tool for promoting the product being dispensed in a bar or night club which is dark and crowded.

It is understood that the particular shape of the tray 15 or the material used or the shapes of the openings 16 or receptacles 16 can vary, and that the invention is not to any one particular shape or configuration.

I do not limit myself to any particular details or constructions set forth in this specification illustrated in the drawings as the same of what is only certain by invention and it is observed that the same may be modified without departing from the spirit or the scope of the claimed invention.

I claim:

1. An illuminated hand-held serving tray, comprising: a hand-held tray, having a plurality of openings, and formed of a light permeable photo-luminescent material; and at least one light source connected to a first surface of said tray for uniform light dispersion; reflective material on at least a portion of a second surface of said tray, said reflective material being placed directly opposite and over said light source to reflect escaping light back into said tray, so that when said at least one light source shines on said tray said reflective material reflects the light from said light source throughout the light-permeable, photoluminescent material of said tray so as to illuminate said tray throughout.

2. The illuminated tray according to claim 1 wherein said tray further comprises at least one leg connected to said first surface of said tray.

3. The illuminated tray according to claim 2 wherein said at least one leg are three legs.

4. An illuminated tray according to claim 1 wherein said tray is made of a plastic material.

5. The illuminated tray according to claim 1 wherein said tray is made of a colored transparent material so that said tray illuminates when a light from said light source is applied to said tray.

6. The tray according to claim 1 wherein said light source is a flashlight mounted on said tray.

7. The illuminated tray according to claim 6 wherein said tray has a center portion and said flashlight is mounted onto the center portion of said tray.

8. The illuminated tray according to claim 7 wherein said center portion has a top side and a bottom side and said reflective material covers the top side of said center portion of said tray and said flashlight is mounted directly underneath the bottom side of said center portion of said tray so that when said flashlight shines on said tray said reflective material reflects the light from said flashlight to illuminate the tray throughout.

9. The illuminated tray according to claim 8 wherein said reflective material has indicia thereon identifying a name of a product and that the name is illuminated when said light source shines in said tray.

10. The tray according to claim 1 wherein containers can be placed in the openings of said tray.

11. The illuminated tray according to claim 1 wherein the photoluminescent material forming the tray is coated with phosphorescent coating to further enhance glowing of the tray.

12. The illuminated tray according to claim 1 wherein said photoluminescent material is a highly fluorescent material.

13. The illuminated tray according to claim 12 wherein said highly fluorescent material is made from sheet material.

14. The illuminated tray according to claim 1 wherein said reflective material is adhesively applied to said tray.

15. The illuminated tray according to claim 1 wherein said reflective material is stamped on to said tray.

16. The illuminated tray according to claim 1 wherein said reflective material is silk screened on to said tray.

17. The illuminated tray according to claim 1 wherein said tray is injection molded.

18. The illuminated tray according to claim 17 wherein said light source has a housing and said housing is part of said injection molded tray.

19. The illuminated tray according to claim 1 wherein said tray is circularly shaped.

20. The illuminated tray according to claim 1 wherein said at least one said light source is two light sources.

21. An illuminated hand-held serving tray, according to claim 1 wherein said tray includes a handle portion for carrying said tray.

22. An illuminated hand-held serving tray according to claim 21 wherein said light source is a flashlight and said flashlight has a casing which acts as said handle.

23. An illuminated tray according to claim 1 wherein said reflective material is a reflective label covering at least a portion of said tray.

* * * * *